(12) United States Patent
Renforth et al.

(10) Patent No.: US 10,609,905 B2
(45) Date of Patent: Apr. 7, 2020

(54) PET TOY WITH TELESCOPING WAND WITH RETRACTABLE CORD APPARATUS

(71) Applicant: DOSKOCIL MANUFACTURING COMPANY, INC., Arlington, TX (US)

(72) Inventors: Jack William Renforth, Azle, TX (US); Jackson Galaxy, Northridge, CA (US)

(73) Assignee: LITTLE BIG CAT, INC., Beverly Hills, CA (US)

(*) Notice: Subject to any disclaimer, the term of this patent is extended or adjusted under 35 U.S.C. 154(b) by 86 days.

(21) Appl. No.: 14/642,140

(22) Filed: Mar. 9, 2015

(65) Prior Publication Data

US 2015/0257365 A1    Sep. 17, 2015

Related U.S. Application Data

(60) Provisional application No. 61/951,214, filed on Mar. 11, 2014.

(51) Int. Cl.
*A01K 15/02* (2006.01)
*A01K 29/00* (2006.01)
*B25G 1/04* (2006.01)

(52) U.S. Cl.
CPC ............ *A01K 15/025* (2013.01); *A01K 29/00* (2013.01); *B25G 1/04* (2013.01)

(58) Field of Classification Search
CPC .............................. A01K 15/025; A01K 15/02
USPC ................... 119/708, 707, 702, 795
See application file for complete search history.

(56) References Cited

U.S. PATENT DOCUMENTS

| | | | | |
|---|---|---|---|---|
| 2,307,905 A | * | 1/1943 | Ament | A01K 15/025 119/708 |
| 2,437,786 A | * | 3/1948 | Oberdorf | A01K 1/04 119/789 |
| 2,632,609 A | * | 3/1953 | Kirby | A01K 89/0171 242/375.1 |
| 4,048,749 A | * | 9/1977 | Zitting | A63H 3/18 428/16 |
| 4,088,319 A | * | 5/1978 | Clarke | A63B 43/02 273/317 |
| 5,467,740 A | | 11/1995 | Redwine | |
| 5,564,454 A | * | 10/1996 | Curley | E04H 15/40 135/119 |
| 5,782,207 A | | 7/1998 | Goodham | |
| 5,947,790 A | * | 9/1999 | Gordon | A01K 15/025 119/707 |
| 6,565,404 B2 | * | 5/2003 | Oblack | A63H 33/18 446/46 |
| 8,181,606 B1 | | 5/2012 | Kirschbaum | |

(Continued)

FOREIGN PATENT DOCUMENTS

WO    WO-9931973 A1  *  7/1999  .............. A01K 1/04

*Primary Examiner* — Peter M Poon
*Assistant Examiner* — Jeffrey R Larsen
(74) *Attorney, Agent, or Firm* — Global IP Counselors, LLP

(57) ABSTRACT

A pet toy includes a handle, a cord, a retractable cord apparatus coupled with a first end of the cord and being structured to retract the cord into itself after the cord has been pulled out, an attachment mechanism coupled to the second end of the cord and structured to releasably couple to an object, and a telescopic pole having a first end coupled to the handle and a second end coupled to the retractable cord apparatus.

14 Claims, 11 Drawing Sheets

(56) References Cited

U.S. PATENT DOCUMENTS

2003/0136352 A1* 7/2003 Lazarich .............. A01K 15/025
119/708
2009/0205580 A1* 8/2009 Tiefel ................... A01K 15/025
119/708

* cited by examiner

PET TOY WITH TELESCOPING WAND WITH RETRACTABLE CORD APPARATUS

CROSS-REFERENCE TO RELATED APPLICATIONS

This patent application claims the priority benefit under 35 U.S.C. § 119(e) of U.S. Provisional Application No. 61/951,214 filed on Mar. 11, 2014, and entitled, "TELESCOPING WAND WITH RETRACTABLE CORD AND FIXING TOY," the contents of which are hereby incorporated herein by reference.

BACKGROUND OF THE INVENTION

1. Field of the Invention

The disclosed concept relates generally to pet toys and, more particularly, to a pet toy including a wand with an attached object.

2. Description of the Related Art

It is generally well known in the relevant art to attach an object to the end of a wand using a string or chain to create a pet toy. These types of pet toys are particularly suitable as cat toys. Swinging the wand causes the object to move about as if it were flying or running which entice a cat to chase and catch the object. One example of such a cat toy is described in U.S. Pat. No. 6,318,300.

Although the types of pet toys using a wand with an object attached to it are suitable for entertaining pets, they are not without their drawbacks. For instance, the wand is generally an elongated piece that can be several feet long making it difficult or impractical to ship the pet toy. Also, the string or chain tends to become tangled when using the pet toy. Furthermore, the object attached to the string tends to wear out before the wand, and it can be difficult or impossible to attach a new object to the string.

It would thus be desirable to provide an improved pet toy that overcomes these and other shortcomings in the relevant art.

SUMMARY OF THE INVENTION

These needs and others are met by embodiments of the disclosed concept in which a pet toy includes a telescoping wand and a retractable cord apparatus.

In accordance with aspects of the disclosed concept, a pet toy comprises a handle; a cord; a retractable cord apparatus coupled with a first end of the cord and being structured to retract the cord into itself after the cord has been pulled out; an attachment mechanism coupled to the second end of the cord and structured to releasably couple to an object; and a telescopic pole having a first end coupled to the handle and a second end coupled to the retractable cord apparatus.

In accordance with other aspects of the disclosed concept, a pet toy, comprises: an object; a handle; a cord; a retractable cord apparatus coupled with a first end of the cord and being structured to retract the cord into itself after the cord has been pulled out; an attachment mechanism coupled to the second end of the cord and structured to releasably couple to the object; and a telescopic pole having a first end coupled to the handle and a second end coupled to the retractable cord apparatus.

BRIEF DESCRIPTION OF THE DRAWINGS

A further understanding of the disclosed and claimed concept can be gained from the following Description when read in conjunction with the accompanying drawing in which:

Similar numerals refer to similar parts throughout the specification.

DETAILED DESCRIPTION OF EXEMPLARY EMBODIMENTS

Figure 1A:
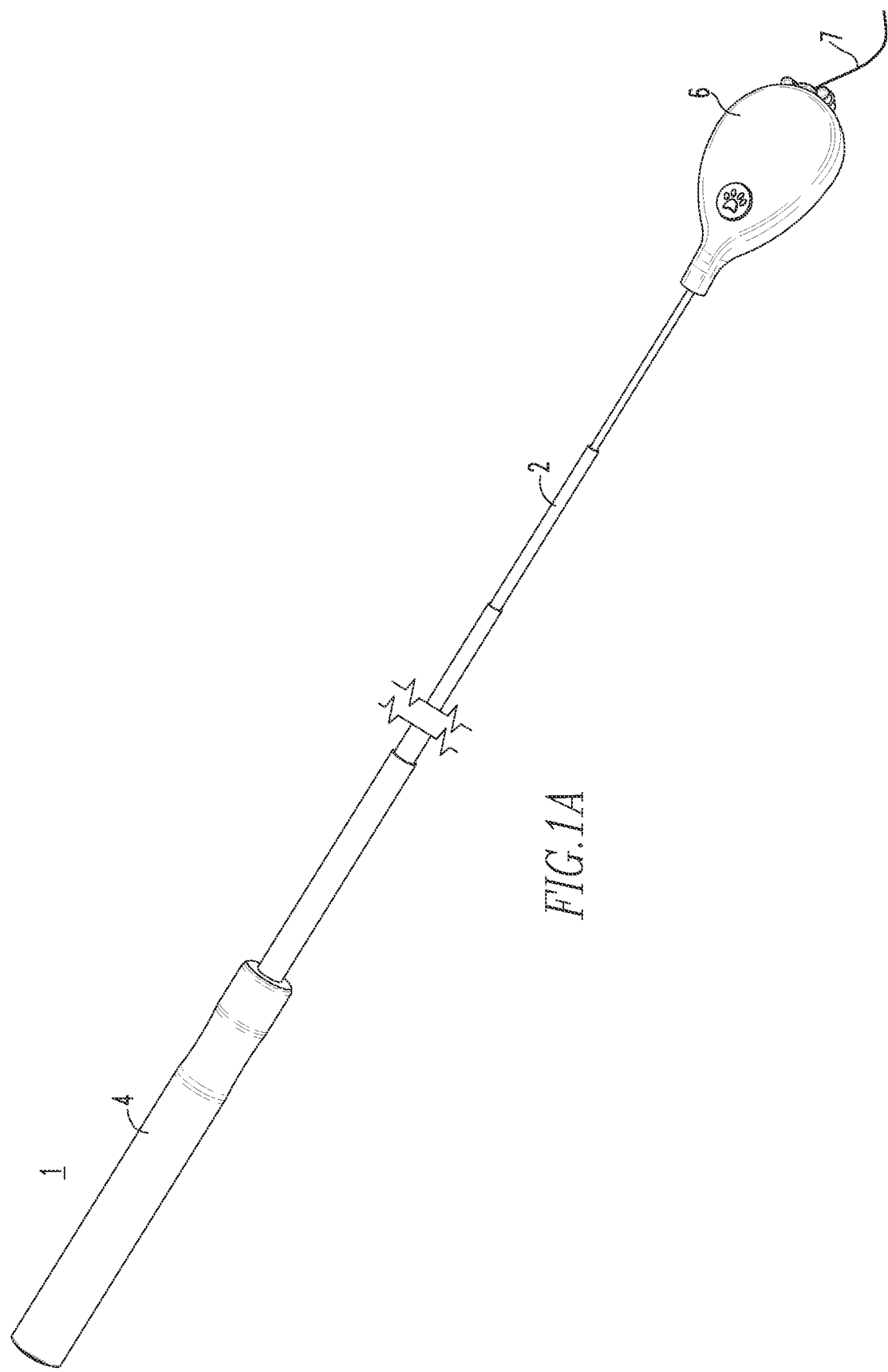
FIGS. 1A and 1B are isometric views of a telescoping wand with a retractable cord apparatus in accordance with an example embodiment of the disclosed concept.

Directional phrases used herein, such as, for example, left, right, front, back, top, bottom and derivatives thereof, relate to the orientation of the elements shown in the drawings and are not limiting upon the claims unless expressly recited therein.

Figure 1B:
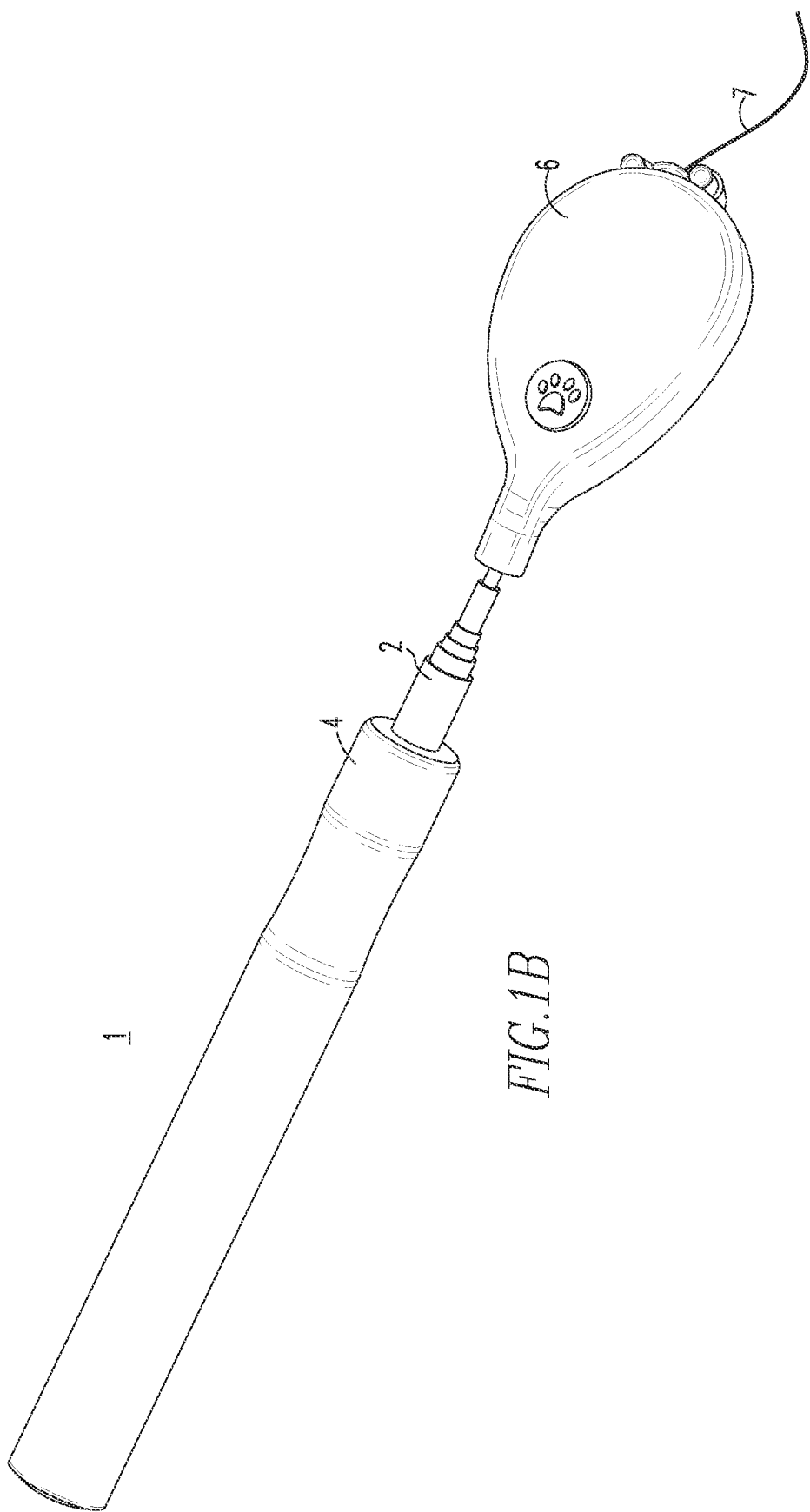

FIGS. 1A and 1B include isometric views of a portion of a pet toy 1 in an extended (FIG. 1A) and a retracted (FIG. 1B) position. The pet toy 1 includes a telescoping wand 2. A handle 4 is attached to one end of the telescoping wand 2 and a retractable cord apparatus 6 is attached to the other end of the telescoping wand 2. A cord 7 extends from the retractable cord apparatus 6 and its distal end is attached to an object via an attachment mechanism, as will be described in more detail in the description related to FIGS. 5A and 5B. The telescoping wand 2 includes several segments that are able to retract into each other when the pet toy 1 is in the retracted position.

The telescoping wand 2 can be made from any suitable material. For example and without limitation, in some embodiments of the disclosed concept the telescoping wand 2 is made from a metallic material such as stainless steel, in other embodiments of the disclosed concept, the telescoping wand 2 is made from a plastic material.

As shown in FIG. 1B, when the telescoping wand 2 is retracted, the size of the pet toy 1 is considerably reduced. When the telescoping wand 2 is retracted, the majority of it fits within the handle 4. This reduction in size makes it much easier to ship or travel with the pet toy 1.

Figure 2:
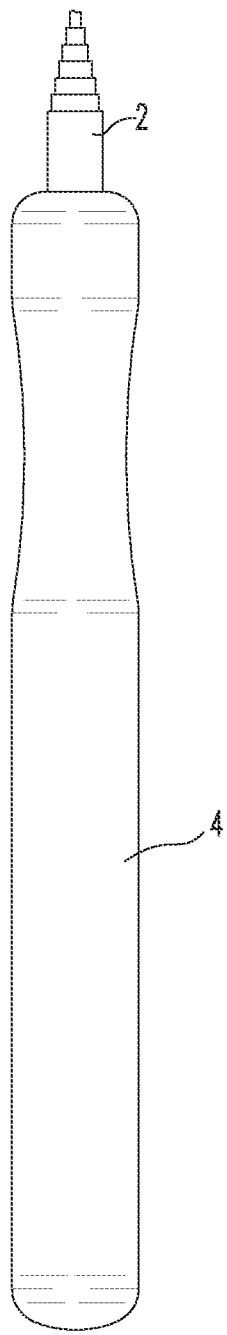
FIG. 2 is a view of a handle in accordance with an embodiment of the disclosed concept.

FIG. 2 is a view of the handle 4 that is used in conjunction with the pet toy 1. The handle 4 is generally hollow so that the telescoping wand 2 can fit inside of it. The handle 4 can be made of any material, but it is preferable that the handle 4 is made of a material that is comfortable and easy to grip.

Figure 3A:
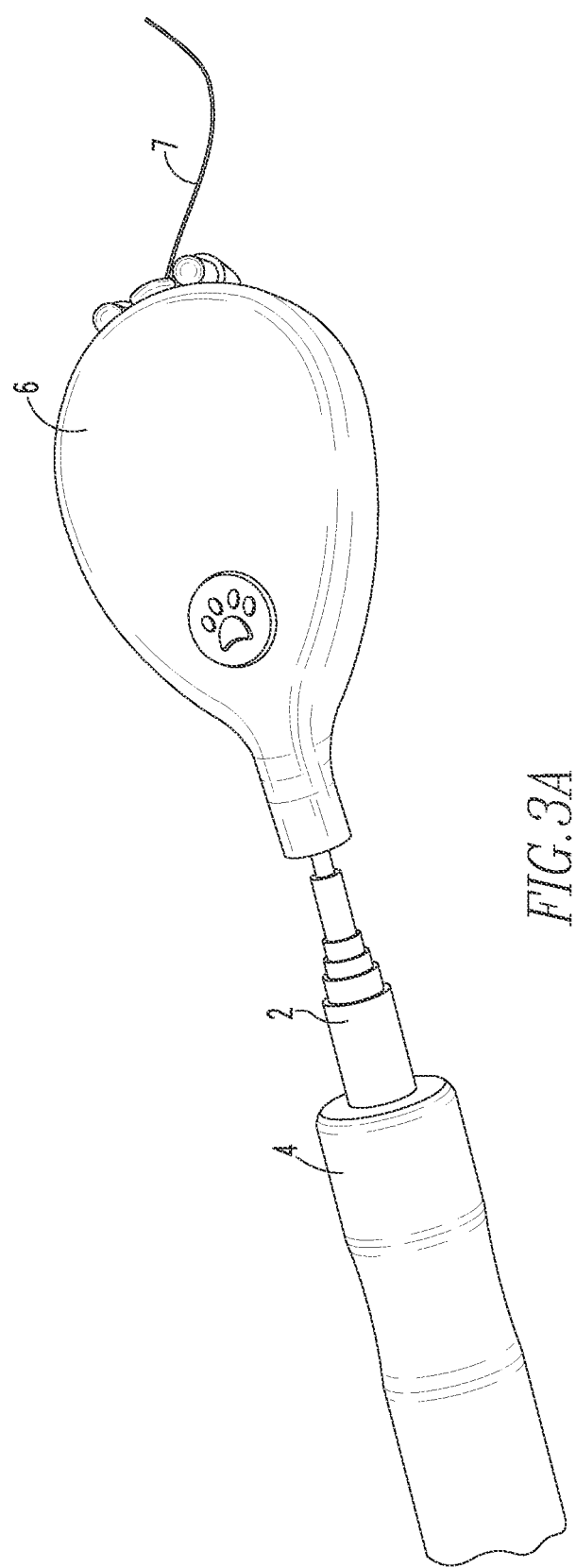
FIGS. 3A-3D are views of a retractable cord apparatus in accordance with an embodiment of the disclosed concept.
Figure 3B:
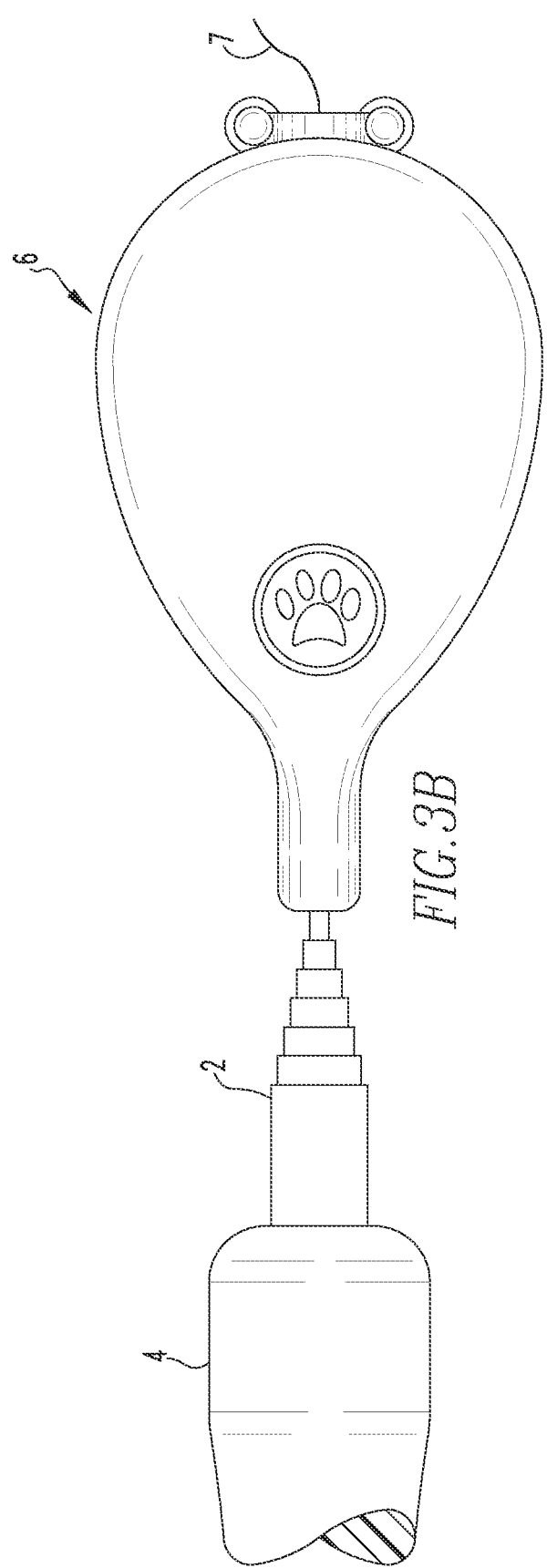
Figure 3C:
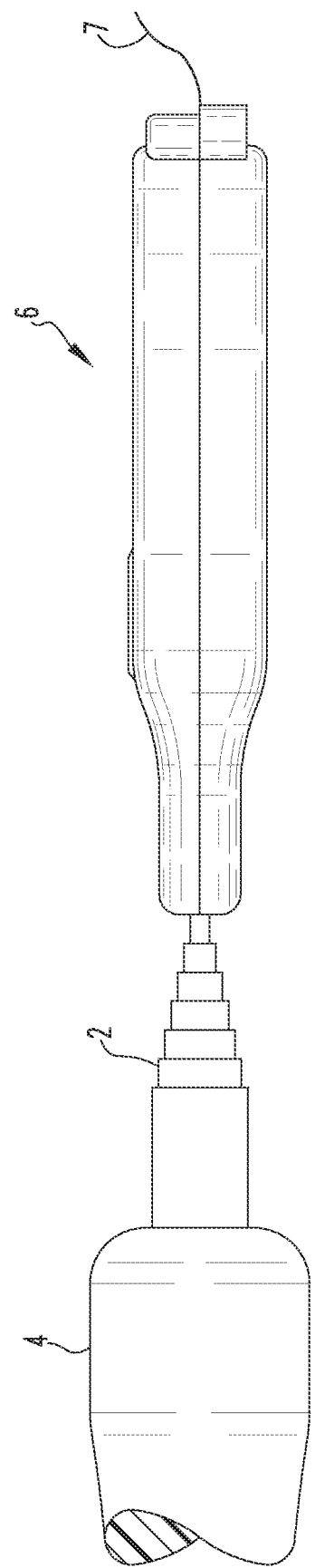
Figure 3D:
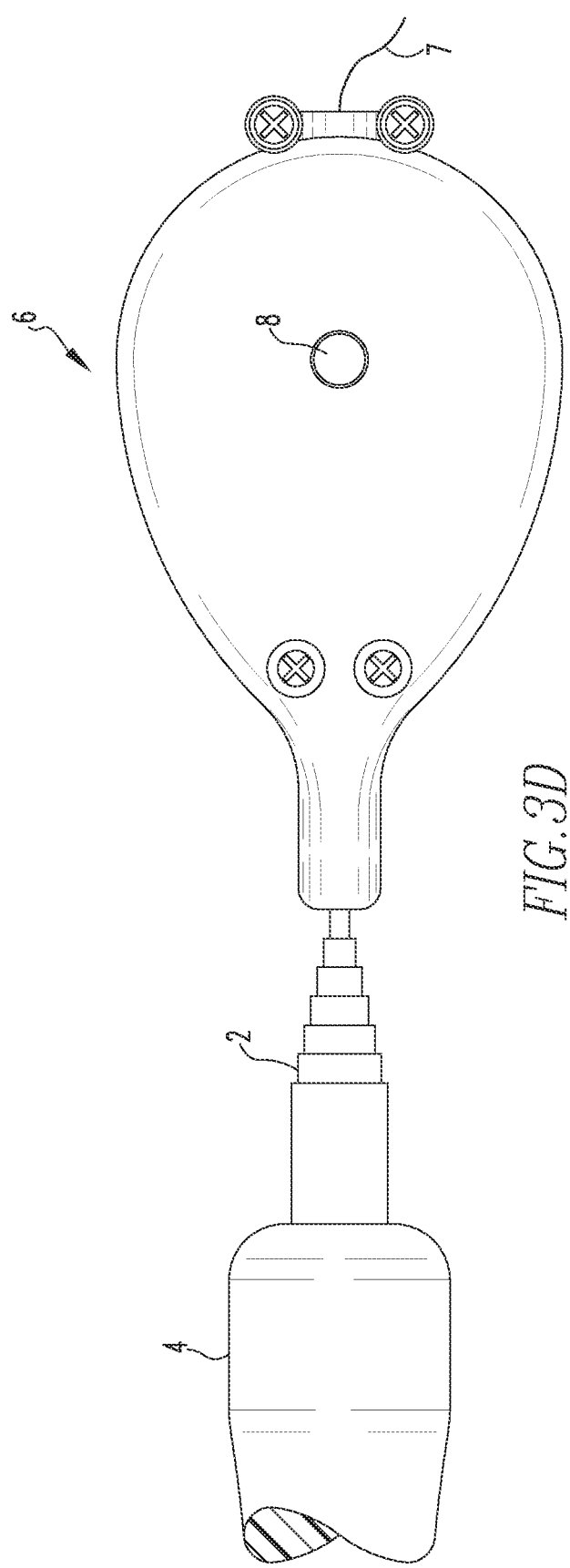

FIGS. 3A-3D are views of the retractable cord apparatus 6. FIG. 3A is an isometric view of the retractable cord apparatus 6, FIG. 3B is a front view of the retractable cord apparatus 6, FIG. 3C is a side view of the retractable cord apparatus 6, and FIG. 3D is a rear view of the retractable cord apparatus 6. As shown in FIGS. 3A-3D, the retractable cord apparatus 6 is attached to the end of the telescoping wand 2. One end of the cord 7 is attached to the retractable cord apparatus 6 inside the retractable cord apparatus 6. The cord 7 extends from the retractable cord apparatus 6. The retractable cord apparatus 6 is functional to retract the cord 7 into it after the cord 7 has been pulled out.

The retraction can be initiated by pressing a button 8 (shown in FIG. 3D) included on the retractable cord apparatus 6. Although the button 8 is shown on the rear of the retractable cord apparatus 8, it will be appreciated that the button 8 may be located at any suitable position on the retractable cord apparatus 6 without departing from the scope of the disclosed concept. Retracting the cord 7 into the retractable cord apparatus 6 helps to prevent the cord 7 from becoming tangled.

The cord 7 can take any suitable form. For example and without limitation, the cord may be a string, chain, or plastic cord without departing from the scope of the disclosed concept.

Figure 4:
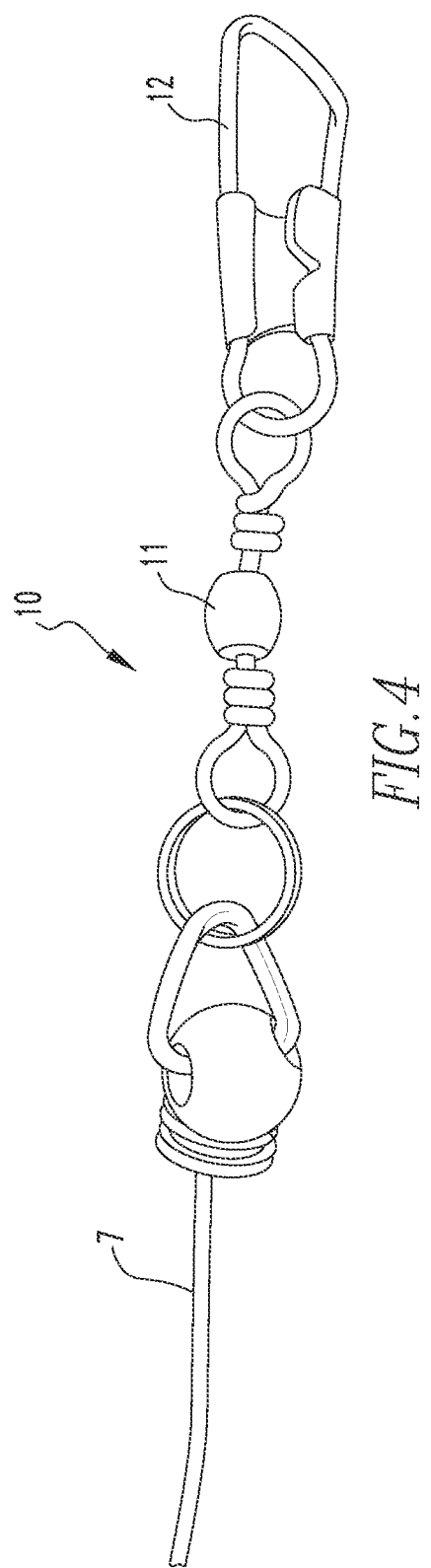
FIG. 4 is a view of an attachment mechanism in accordance with an embodiment of the disclosed concept.

Referring to FIG. 4, an attachment mechanism 10 is shown. The attachment mechanism 10 is structured to releasably attach the cord 7 to an object such as a flying ribbon toy 30 (See FIGS. 5A and 5B). The attachment mechanism 10 shown in FIG. 4 has two primary parts, a swivel attachment 11 and a releasable hook 12. The swivel attachment 11 is coupled with the cord 7 on one end and the releasable hook 12 on the other end. The swivel mechanism 11 is structured to be capable of swiveling. That is, when the object attached to the releasable hook 12 spins, the swivel mechanism 11 will swivel so that the cord 7 does not also spin. This swiveling capability further prevents the cord 7 from becoming twisted or tangled.

Figure 5A:
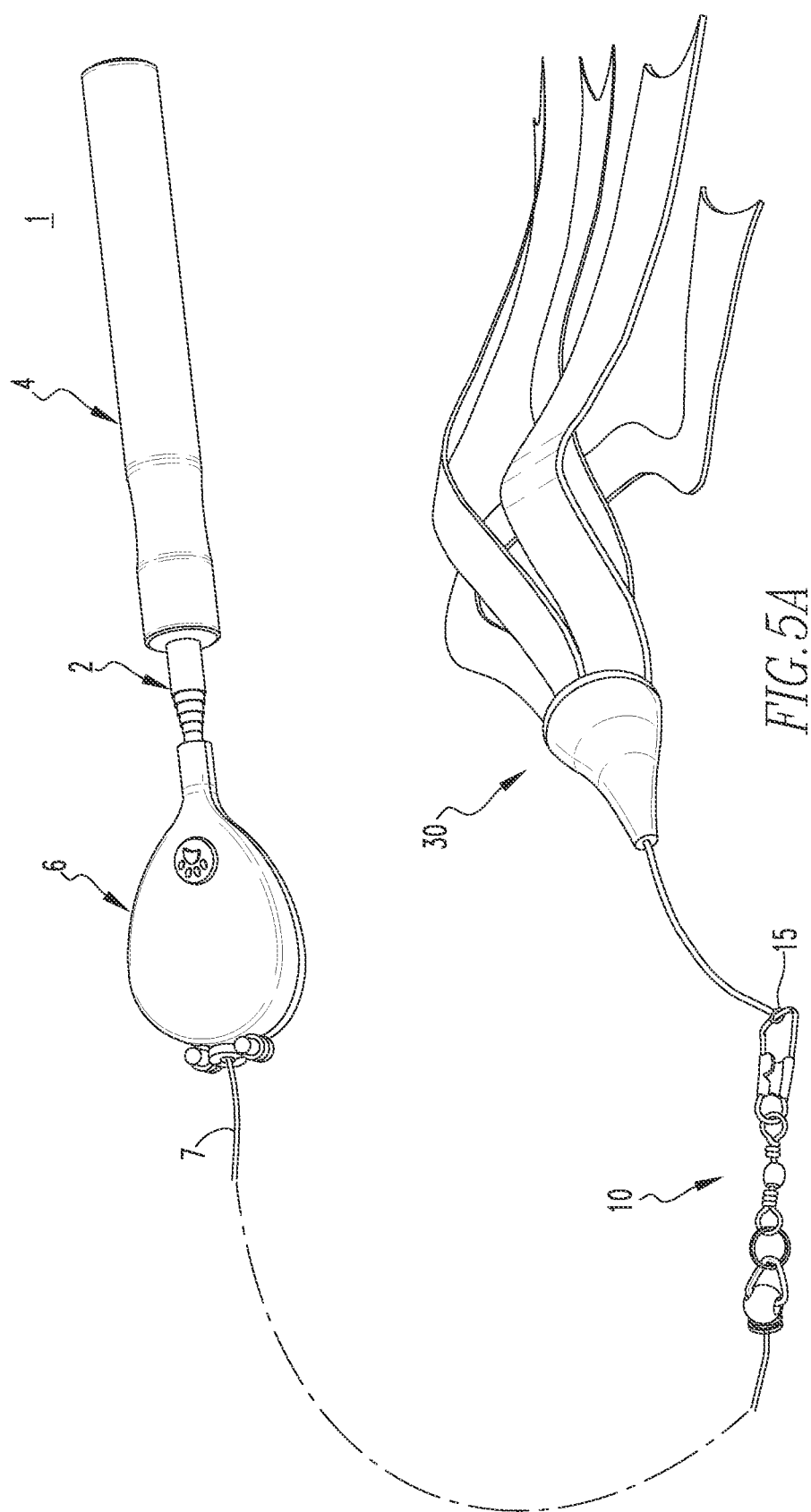
FIGS. 5A and 5B are isometric view of an assembled pet toy in accordance with an example embodiment of the disclosed concept.
Figure 5B:
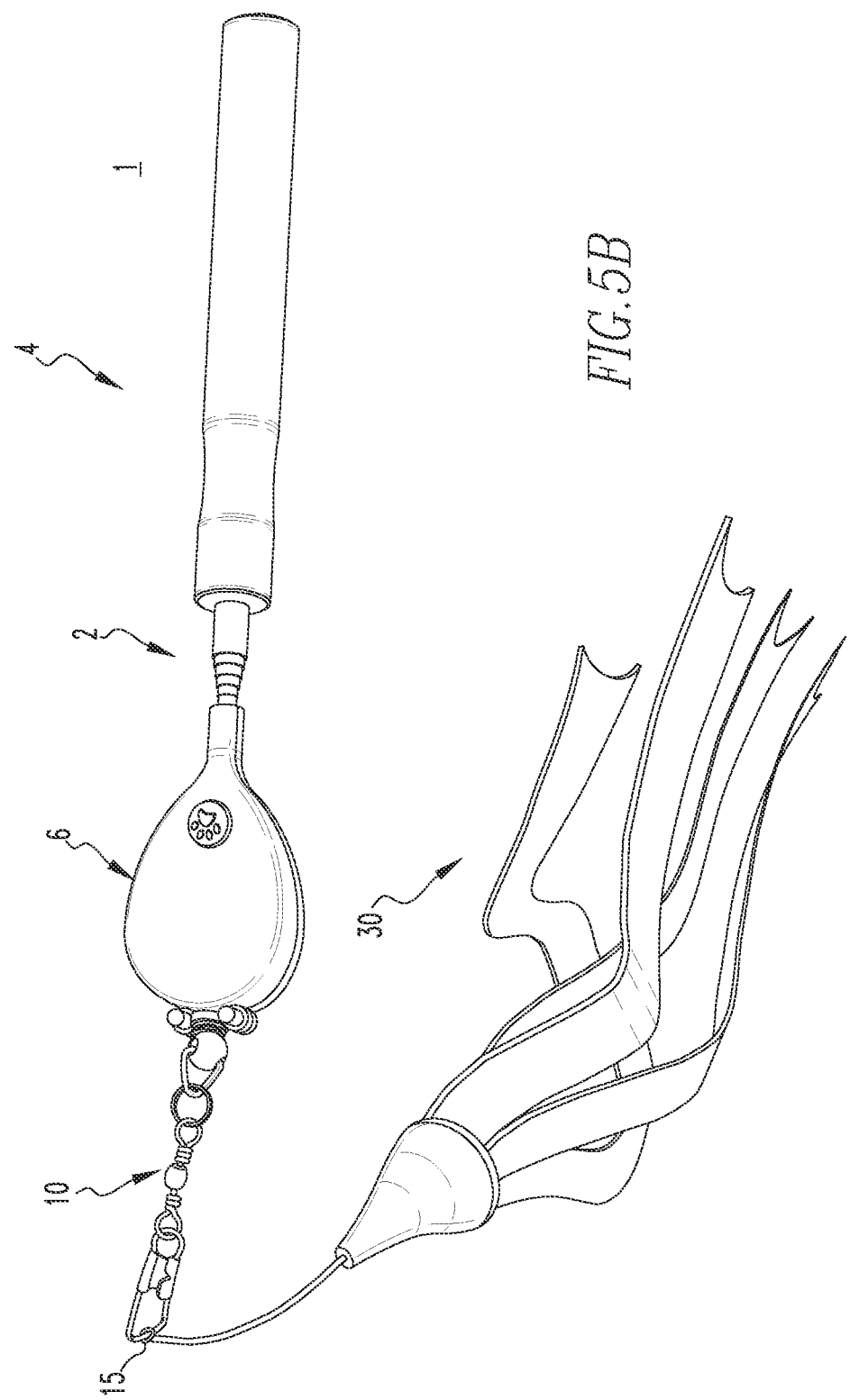
Figure 6:
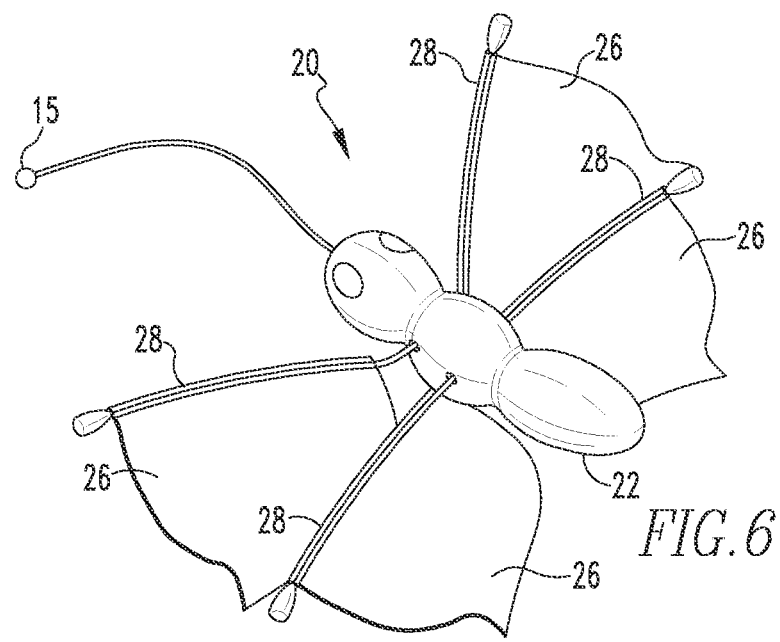
FIGS. 6-9 are views of flying toys in accordance with embodiments of the disclosed concept.

Referring to FIGS. 5A and 5B, the pet toy 1 including a flying ribbon toy 30 is shown. As shown in FIGS. 5A and 5B, one end of the swivel mechanism 11 is coupled to the releasable hook 12. The other end of the releaseable hook 12 is releasably attached to the flying ribbon toy 30 via an attachment point 15 included on the flying ribbon toy 30. The attachment point 15 may be a loop, as shown in FIGS. 5A and 5B, or any other structure suitable to attach to. In some embodiments of the disclosed concept, a cord extends a short distance from the object and the attachment point is disposed at the end of the cord.

The releaseable hook 12 can be easily operated to detach the flying ribbon toy 30 from the releaseable hook 12. The flying ribbon toy 30 can then be easily reattached or another object can be easily attached to the releaseable hook 12. Thus, the attachment mechanism 10 makes it easy to detach an attached object when it becomes worn out and to attach a new object without discarding the other components of the pet toy 1 such as the telescoping wand 2 and retractable cord mechanism 6.

FIGS. 6-9 are examples of objects that can be attached to the distal end of the cord 7 and used in conjunction with the telescoping wand 2 and the retractable cord mechanism 6. For example, referring to FIG. 6, a flying insect toy 20 is an example of an object that can be attached to the cord 7.

The flying insect toy 20 includes a body 22. The body 22 is transparent and includes balls (not shown) inside of it. The flying insect toy 20 also includes wings 26 that are preferably made of a fabric material. Inside the wings 26, a crinkle plastic material (not shown) may be used which will generate some noise when a pet interacts with it. The flying insect toy 20 also includes wing supports 28 which are structured to support the wings 26. The wing supports 28 are preferably made of a rigid material such as a metallic material like stainless steel.

Figure 7:
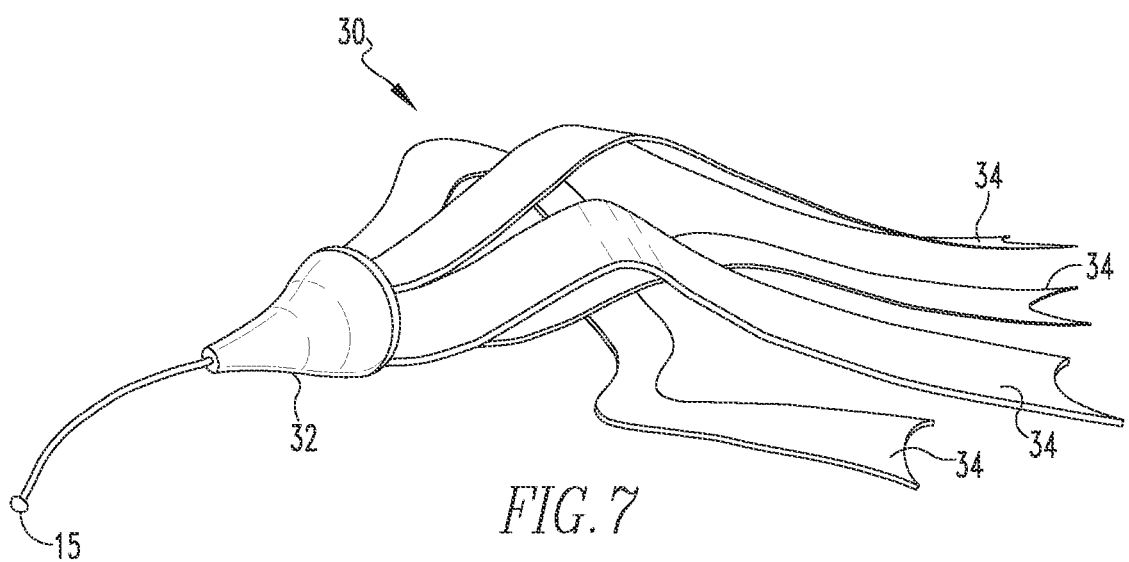

Referring to FIG. 7, a flying ribbon toy 30 is another example of an object that can be attached to the cord 7. The flying ribbon toy 30 includes a tip section 32 and a number of ribbons 34 that are attached to the tip section 32. The tip section 32 is preferably made of a rigid material such as plastic.

Figure 8:
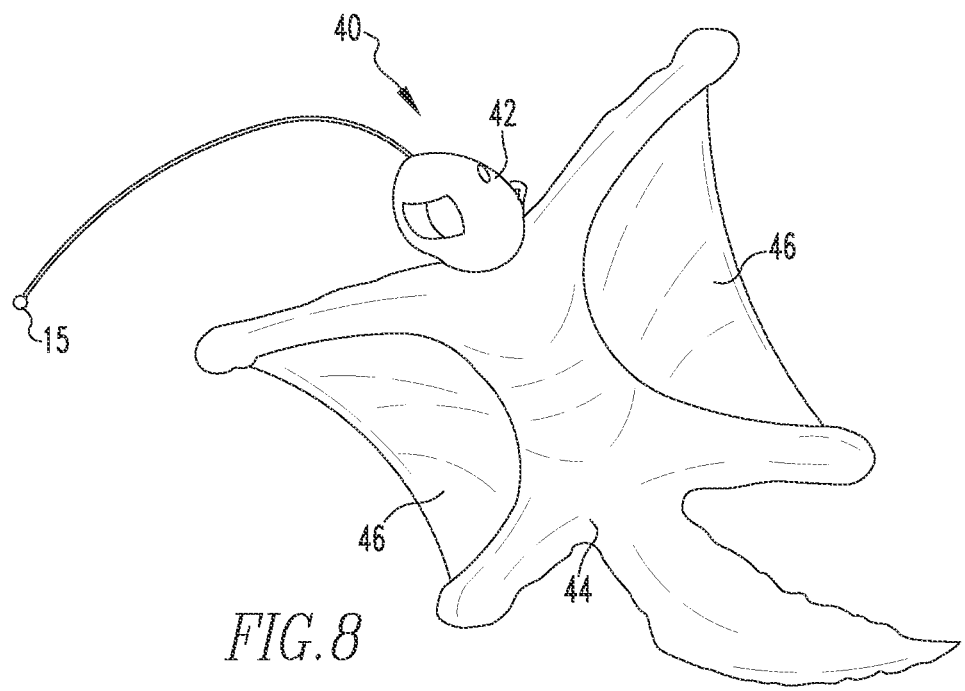

Referring to FIG. 8, a flying squirrel toy 40 is another example of an object that can be attached to the cord 7. The flying squirrel toy 40 includes a head 42. The head 42 is preferably made of a soft rubber material. The flying squirrel toy 40 also includes a body 44. The body 44 includes legs, a torso, and a tail made of a soft material such as fabric. The body 44 also includes a rigid skeleton structure that structurally supports the shape of the body 44. The flying squirrel toy 40 further includes wings 46 that extend between the front and rear legs.

Figure 9:
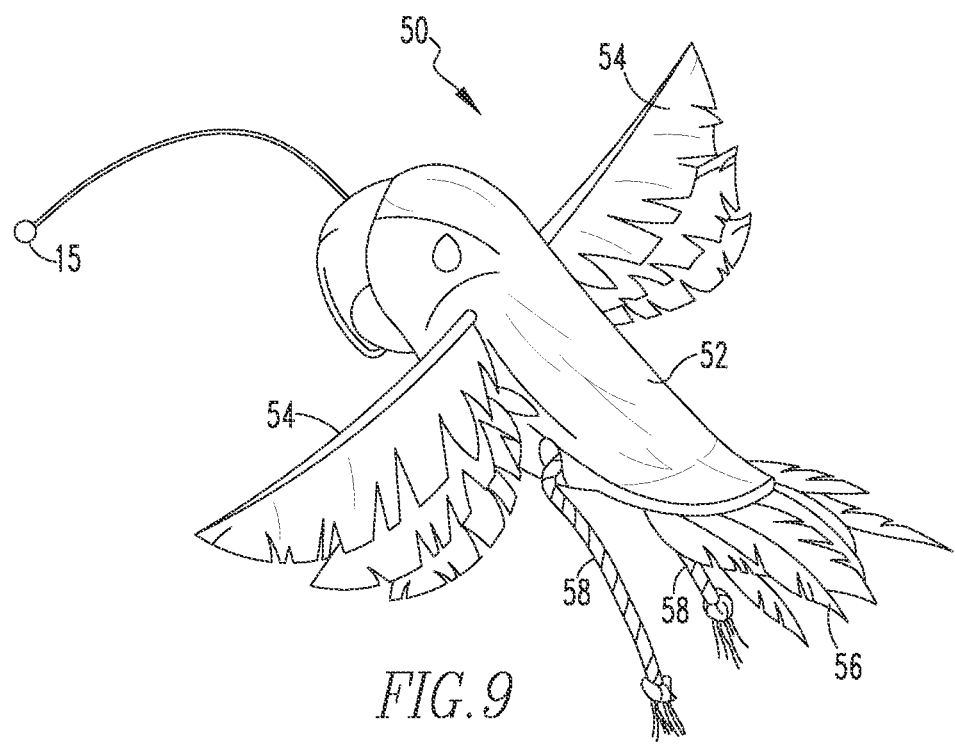

Referring to FIG. 9, a flying bird toy 50 is another example of an object that can be attached to the cord 7. The flying bird toy 50 includes a body 52. The body 52 is preferably made of a soft rubber material. The flying bird toy 50 also includes wings 54. The wings 54 may be constructed of rigid supports with feathers extending therefrom. The flying bird toy 50 further includes a tail 56 that is made of feathers. A knotted cord 58 extends through the body 52 of the flying bird toy 50 and serves as legs for the flying bird toy 50.

While some example of objects that can be attached to the cord 7 have been described with respect to FIGS. 6-9, it will be appreciated that any suitable object may be attached to the cord 7 without departing from the scope of the disclosed concept. The flying insect toy 20, the flying ribbon toy 30, the flying squirrel toy 40, and the flying bird toy 50 are all flying toys which are particularly suitable for use with the telescoping wand 2 and the retractable cord apparatus 6. Swinging the telescoping wand 2 from side to side causes the attached object to swing around as though it were flying.

Although the foregoing discussion has presented specific embodiments, persons skilled in the art will recognize that changes may be made in form and detail without departing from the spirit and scope of the embodiments to achieve similar functionality and utility to the exemplary embodiments disclosed herein. Moreover, it should be appreciated that features from a particular embodiment may be implemented in another embodiment disclosed herein to achieve a desired functionality. Accordingly, the specific embodiments described herein should be understood as examples and not limiting the scope of the disclosure.

What is claimed is:

1. A pet toy, comprising:
  a handle having a first handle end and a second handle end, the first handle end defining an end of the pet toy;
  a cord having a first cord end and a second cord end;
  a retractable cord apparatus coupled with the first cord end, the retractable cord apparatus having a housing and an actuation button disposed on the housing that causes retraction of the cord into the housing of the retractable cord apparatus after the cord has been pulled out of the housing of the retractable cord apparatus and upon actuation of the actuation button;
  an attachment mechanism coupled to the second cord end and structured to releasably couple to an object, the attachment mechanism including
    a releasable hook structured to be releasably coupled to the object,
    a swivel mechanism having a first swivel end coupled with the cord and a second swivel end coupled with the releasable hook, the swivel mechanism being structured to swivel when the releasable hook spins so that the cord does not also spin; and
  a telescopic wand having a first pole end coupled to the second handle end and a second pole end coupled to the housing of the retractable cord apparatus.

2. The pet toy of claim 1, wherein
the telescopic wand includes a plurality of segments that are structured to retract into each other.

3. The pet toy of claim 1, wherein
the telescopic wand is composed of a metallic material or a plastic material.
4. The pet toy of claim 1, wherein
the handle includes a hollow interior portion structured to receive the telescopic wand.
5. The pet toy of claim 1, wherein
the cord is one of a string, a chain or a plastic cord.
6. The pet toy of claim 1, wherein
the object is a flying toy.
7. The pet toy of claim 6, wherein
the object is a flying insect toy including:
a body;
wing supports extending from the body; and
wings spanning between the wing supports.
8. The pet toy of claim 7, wherein
crinkle plastic material is disposed inside the wings.
9. The pet toy of claim 6, wherein
the object is a flying ribbon toy including:
a tip section; and
a number of ribbons attached to the tip section.
10. The pet toy of claim 9, wherein
the tip section is composed of a rigid material.
11. The pet toy of claim 6, wherein
the object is a flying squirrel toy including:
a head;
a body including a torso and legs; and
wings spanning between the legs.
12. The pet toy of claim 11, wherein
the body includes a rigid interior skeleton and an exterior skin composed of fabric.
13. The pet toy of claim 6, wherein
the object is a flying bird toy including:
a body;
wings extending from the body and including feathers; and
a tail including feathers.
14. The pet toy of claim 13, wherein
the flying bird toy further includes legs composed of a knotted cord.

* * * * *